United States Patent [19]

Stöber

[11] 3,851,534
[45] Dec. 3, 1974

[54] VARIABLE RATIO FRICTION TRANSMISSION

[75] Inventor: Paul Stöber, Pforzheim, Germany
[73] Assignee: Gebr. Stober, Pforzheim, Germany
[22] Filed: May 29, 1973
[21] Appl. No.: 364,332

[30] Foreign Application Priority Data
May 31, 1972   Germany............................ 2226447

[52] U.S. Cl..................................... 74/193, 74/200
[51] Int. Cl....................... F16h 15/16, F16h 15/08
[58] Field of Search............ 74/193, 194, 199, 200, 74/191, 192

[56] References Cited
UNITED STATES PATENTS
2,336,799   12/1943   Palm..................................... 74/193
3,388,607   6/1968   Stober................................... 74/191

FOREIGN PATENTS OR APPLICATIONS
122,816   12/1939   Sweden................................ 74/192
517,001   2/1955   Italy..................................... 74/191
608,487   4/1926   France.................................. 74/193
608,344   9/1948   Great Britain........................ 74/193

Primary Examiner—Samuel Scott
Assistant Examiner—Allan Russell Burke
Attorney, Agent, or Firm—Walter Becker

[57] ABSTRACT

A variable ratio friction transmission in which an input shaft and an intermediate shaft and an output shaft are arranged substantially in end to end relation with cooperating elements of friction drive means on the adjacent ends of the shaft. Each set of cooperating friction drive elements consist of a friction cone and a friction ring. The intermediate shaft is adjustable transverse to the length thereof to change the drive ratio of the transmission and torque responsive means is included in the drive train responsive to torque being transmitted therethrough for urging the friction elements toward one another.

16 Claims, 6 Drawing Figures

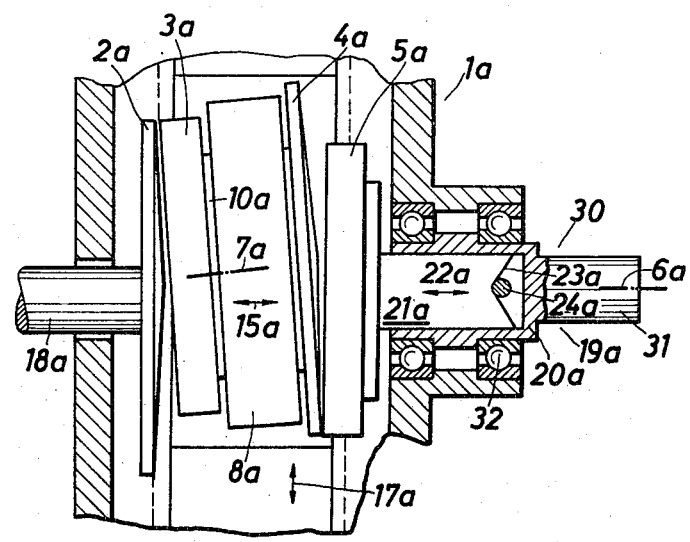
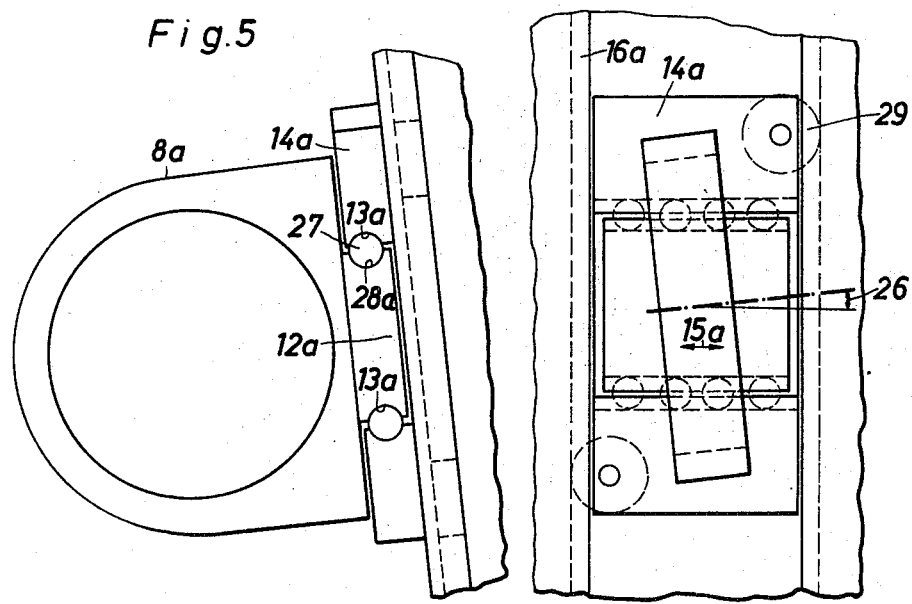

VARIABLE RATIO FRICTION TRANSMISSION

The present invention relates to a variable friction disc transmission with an input shaft and an output shaft, which are respectively connected to a first rotor in the form of a first friction cone and a first friction ring, which is approximately axis parallel to said first friction cone. More specifically, the present invention relates to a friction disc transmission which is provided with an intermediate shaft located between the first rotors on a support and movable in the axial direction of the transmission, said intermediate shaft comprising a second friction ring engaging said first friction cone and also comprising a second friction cone engaging said first friction ring. The said support is displaceable at substantially a right angle with regard to the axial direction of the transmission in the direction of a control movement by guiding means on a transmission housing, or the like, and one of the first rotors is axially displaceable.

According to a heretofore known friction disc transmission of the type involved, the second friction cone and the second friction ring are, by means of a common shaft, displaceable in their axial direction relative to the support, whereby they are able to be located in their axial direction in such a way that all frictional surfaces are in engagement with each other. This design, however, has the drawback that a relatively great axial extension of the structural element formed by the second friction cone and the second friction ring will result, which fact brings about a relatively great length of the variable transmission.

It is, therefore, an object of the present invention to provide a friction disc transmission of the above mentioned general type which will be simple in construction, have relatively short dimensions, and will be subjected only to a slight wear, in spite of its simple construction and the relatively high torque to be transmitted.

These and other objects and advantages of the invention will appear more clearly from the following specification, in connection with the accompanying drawings, in which.

Figure 1:
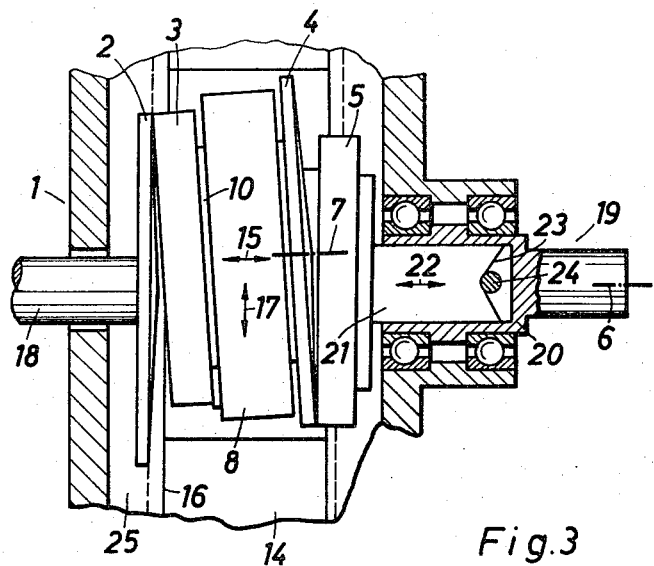
FIG. 1 is a cutout of a friction disc transmission according to the invention and illustrates the same partially in axial section.
Figures 2, 3:
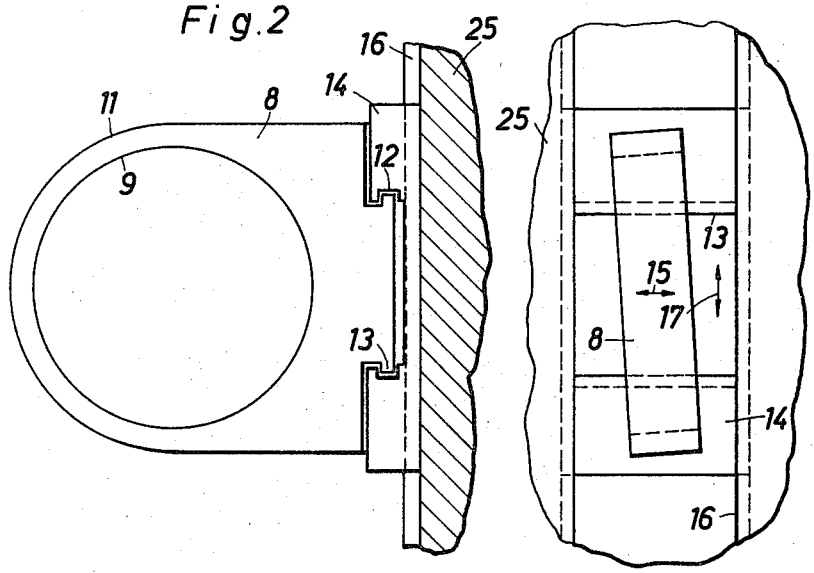
FIG. 2 shows the support of the friction disc transmission of FIG. 1 as seen from the right-hand side of FIG. 1.
FIG. 3 shows the device of FIG. 2 as seen from the left-hand side in the drawing.

FIGS. 4 to 6 respectively illustrate sections and views similar to those of FIGS. 1 to 3 of a modified friction disc transmission according to the invention.

The friction disc transmission according to the invention is characterized primarily in that the second friction cone and the second friction ring are non-displaceably mounted in axial direction on a support which, in its turn, is by guiding means movably journaled approximately parallelly with regard to the axis of the first friction cone and of the first friction ring, and is furthermore characterized in that the guiding means of the support is, in radially spaced relationship, arranged with regard to the friction cones and the friction rings. In this way, a very favorable engagement of the friction surfaces with each other will be assured, while the guiding of the support at a radial distance from the friction ring and friction cone can be made relatively large without requiring additional space or without impeding the engagement of the friction cones and friction rings with each other.

A particularly advantageous further development of the invention consists in that the guiding means for the support, preferably the guiding means for the carriage is provided on the inner side of a housing wall, which guiding means is detachably connected to the housing, for instance, by screws, so that a very simple assembly will be assured. Furthermore, it is also possible in this way, so to provide the design that the wall of the housing is selectively connectable to two oppositely located sides of the housing whereby the friction disc transmission can easily be adapted to the respective requirements.

According to a further feature of the invention, the first rotor on the output side is, by means of a torque dependent control device axially displaceable toward the pertaining second rotor, and that the axis of the intermediate shaft which is approximately parallel to the axial plane of at least one of the first rotors, said axial plane being parallel to the direction of the control movement, is located at an angle of from 6° to 9° with regard to the axis of the rotor at the output side. Experience has shown that in this way a particularly favorable operation of the control transmission will be assured, while furthermore, at the output side relative to the input side, in a simple manner, greater roll diameters of the rotor can be obtained. In view of the arrangement of the control device on the output side of the control transmission, a very fine response of the control device will be assured.

Referring now to the drawings in detail, FIGS. 1 to 3 illustrate a transmission housing 1 having rotatably mounted therein two friction cones 2, 4 and two friction discs 3, 5, the arrangement being such that respectively a friction cone 2, 4 is in engagement with a friction ring or disc 3, 5.

A first friction cone 2 and a first friction ring or disc 5, which is not in direct engagement with said first friction cone 2, are rotatable about a common axis 6 directly on the transmission housing 1. The second friction ring or disc 3 which is in engagement with the first friction cone 2, and the second friction cone 4, which is in engagement with the first friction ring or disc 5 are rotatable about a common axis 7 and are mounted on a support or bearing block 8, while the axis 7 is, in conformity with the conical shape of the friction cones 2, 4, slightly inclined toward the axis 6, but located therewith in a common plane.

The support 8 is in the form of a plate and has a bearing bore 9 for journaling the shaft 10. At both ends of shaft 10, there are provided the second friction disc 3 and the second friction cone 4 respectively. The corresponding end edge 11 of the support 8 is curved about the central axis of the bearing bore 9. At that edge of the support 8 which faces away from the end edge 11, the support 8 is provided with a sliding body 12, when viewed in the displacement direction, has an approximately T-shaped sliding body 12. The sliding body 12 slidably engages a guiding groove 13 of a carriage 14, which guiding groove is designed according to a cross section. The support 8 is displaceable with the sliding body 12 in groove 13 parallel to the axis 6 in the direction of the arrow 15. The second dirction disc 3 is located at one side surface, and the second friction cone 4 is located at the other side surface of the support 8 in immediate vicinity thereto.

The carriage 14 is displaceably mounted in guiding means 16 at a right angle to the axis 6 and parallel to the plane indicated by the arrow 17, in which plane both axes 6 and 7 are located.

In view of this displaceability, the transmission ratio of the friction disc transmission can be infinitely varied. The guiding means 16 is formed by two groups which are located opposite to each other and with their open side face each other. These groups are engaged by the carriage 14 and, more specifically, lateral sliding webs thereof, in such a way that the ends of the guiding groove 13 are not closed by the guiding means 16. The guiding means 16 is provided on a wall 25 of the housing, which wall is, in a non-illustrated manner, detachably connected to the housing 1, for instance, by means of screws. The speed control device engaging the carriage 14 has not been illustrated in order not to clog up the drawing. By means of said speed control device, it is possible to adjust the carriage 14 in the direction of the arrow 17 and to arrest the same.

The shaft 18 which is connected to the first friction cone 2 and is protruding from the transmission housing 1 is designed as input shaft of the transmission, whereas the shaft 19 which is connected to the first friction disc 5 and likewise protrudes from the housing is provided as output shaft. The output shaft 19 is formed by two telescopically displaceable shaft sections 20, 21, of which that section which protrudes from the transmission housing carries a sleeve section, in which that section 21 which is connected to the friction disc 5 is displaceable parallel to the axis 6 in the direction of the arrow 22. The end of this section 21 is designed as a V-shaped depressed cam surface 23 engaged by a transverse pin 24 which is connected in the sleeve portion of the section 20. The shaft section 21 is, in addition to being axially displaceable, also rotatable in the shaft section 20. The described pressing device presses all frictional surfaces, more or less strongly, against each other, depending on the torque to be furnished. The second friction disc 3 and the second friction cone 4 will in this connection carry out movements in the direction indicated by the arrow 15. Inasmuch as the support 8 is movable in the direction of the arrow 15, the friction ring 3 and the friction cone 4 may be non-displaceable in their axial direction relative to the support 8.

According to the embodiment illustrated in FIGS. 4 – 6, the axis 7a of the intermediate shaft is inclined relative to the axis 6a approximately by twice the conicity of the friction cones 2, 4, namely, by an angle 26 of approximately from 6° to 9°. The axis 7a, however, is located with the axis 6a in a common axial plane in such a way that the friction cones 2a, 4a will always with their maximum rolling radius engage the respective friction discs 3a, 5a.

At that edge of the support 8a which faces away from the end edge 11a, the support 8a comprises a protruding carriage 12a which may, for instance, form one piece with the support 8a, or is formed by a plate mounted thereon. The carriage 12a is at two lateral edges which are located opposite to each other provided with grooves 28 for antifriction balls 27 which additionally are guided in corresponding grooves 13a of the carriage 14a. The support 8a is with this carriage 12a by ball guiding means 27 displaceable back and forth to a relatively small extent in the direction of the arrow 15a parallel to the axis 6a. The second carriage 14a which is provided as control carriage has two laterally protruding rollers 29 which engage parallel grooves 16a of rectangular or square cross section, said grooves having their open sides facing each other. On each side of the carriage 14a there is provided only one single roller 29 while the rollers 29 are arranged directly adjacent to the front and rear ends of the carriage 14a with regard to the direction of the control movement (arrow 17a). The rollers 29 are arranged at the same distance from an axis which is parallel to the axis 6a and intersects the axis 7a approximately in the middle between the friction surfaces of the rotors 3a, 4a. The rollers 29 are respectively provided on that side of the carriage 14a which is spaced farther from the pertaining lateral section of the support 8a in such a way that in view of the friction pressure exerted by the rotors 2a – 5a upon the support 8a and thus through the torque exerted by the ball guiding means upon the carriage 14a presses the rollers 29 against the bottom surfaces of the guiding grooves 16a in a play-free manner about an axis which is at a right angle with regard to the common axial plane of the axes 6a, 7a. The cylindrical rollers 29 have a thickness approximately corresponding to the width of the guiding grooves 16a so that the carriage 14a will also in axial direction of the rollers 29, i.e. at a right angle to the common axial plane of the axes 6a, 7a be secured against movements.

The control transmission furthermore comprises a control device 30 for pressing the rotors 2a – 5a against each other in conformity with the torque, said control device 30 engaging the output shaft 19a. The output shaft 19a is formed by two shaft sections 20a, 21a which are telescopically movable relative to each other. Of these shaft sections 20a, 21a, the shaft section protruding from the transmission housing is designed as outer shaft section which comprises a sleeve section. In said sleeve section, the shaft section 21a is displaceable in the direction of the arrow 22a parallel to the axis 6a, said shaft section 21a being connected to the friction disc 5a. The end at the end face of said inner shaft section 21a is, for purposes of forming an inclined cam surface, provided with a V-shaped depressed cam surface 23a. The cam surface 23a is engaged by a transverse pin 24a which is adjacent to the bottom wall of the sleeve section of shaft section 20a connected to both ends of the shaft section 20a. Furthermore, the outer shaft section 20a has the outside of the end face of its sleeve section provided with a shaft extension 31. When said shaft extension 31 is subjected to a resistance torque, the shaft sections 20a, 21a are turned relative to each other about the shaft 6a so that by the pin 24a, the shaft section 21a and thus the friction disc 5a are pressed against the friction cone 4a. By displacement of the support 8a in the direction of the arrow 15, also the second friction disc 3a is correspondingly pressed against the pertaining friction cone 2a. For purposes of journaling the output shaft 19a, the sleeve section of the outer shaft section 20a is journaled directly on the transmission housing 1a by bearings 32.

In connection with the present invention it is furthermore important that the control device 30 is arranged substantially within the output shaft. Due to the fact that the shaft 10, 10a is journaled in one ball bearing only in the bearing block designed as cross slide, and due to the fact that the axially effective control device 30 is arranged in the interior of the output shaft, it will be appreciated that in spite of a simple construction and high transmittable torque, a minimum length of the transmission is realized. In view of the inclined position in the bearing block 8a of from 6° to 9°, at the cone - ring pair at the output side, greater roller diameters are obtained which increases the output and reduces the wear. The cross slide which, in addition to a control displacement, also permits an axis-parallel displacement is, for reason of easy operation, journaled on balls or rollers.

It is, of course, to be understood that the present invention is, by no means, limited to the specific showing in the drawings, but also comprises any modifications within the scope of the appended claims.

What is claimed is:

1. A variable friction drive transmission comprising: a frame, parallel input and output shafts rotatable in said frame in axially spaced relation, a first friction cone and a first friction ring each mounted on a respective one of the adjacent ends of said input and output shafts, a second friction ring engaging said first friction cone and a second friction cone engaging said first friction ring, an intermediate shaft, said second cone and second ring being fixed to opposite ends of said intermediate shaft and engaging the respective first ring and cone in radially spaced relation to the axis of said intermediate shaft on opposite sides thereof, a support supporting said intermediate shaft and moveable at an angle to the axes of said input and output shafts to vary the drive ratio of said transmission, means for maintaining said friction cones and friction rings in frictional engagement in adjusted positions of said intermediate shaft, said frame having a wall parallel to said input and output shafts and a first guide groove therein extending at right angles to said input and output shafts, and a carriage slidable in said first guide groove and having a second guide groove therein at right angles to the first guide groove, said support having a portion slidably engaging said second guide groove.

2. A transmission according to claim 1 which includes a support supporting said intermediate shaft, guide means in said frame engaging and guiding said support for movement in a direction parallel to said input and output shafts.

3. A transmission according to claim 2 in which said guide means comprise a member having a groove therein open at one end and said support comprises a portion engaging said groove, and means guiding said guide means on said frame for movement in a direction at right angles to said input and output shafts.

4. A transmission according to claim 1 in which said intermediate shaft is rotatable in said support and said second friction ring and said second friction cone being disposed adjacent opposite sides of said support and being nonaxially moveably connected to said intermediate shaft.

5. A transmission according to claim 1 which includes antifriction bearing means interposed between said portion of said support and said carriage, and rollers on said carriage engaging said frame.

6. A transmission according to claim 5 in which said first guide groove is in the form of opposed linear slots, said rollers extending into and engaging the bottoms of said slots.

7. A transmission according to claim 6 in which said rollers include at least one roller on each end of said carriage and on respectively opposite sides thereof, a plane common to the axes of both rollers extending angularly to the axis of said intermediate shaft.

8. A transmission according to claim 5 in which said antifriction bearing means comprise rolling bodies interposed between each side edge of said portion of said support and said second guide groove.

9. A transmission according to claim 1 in which one of said first friction cone and ring which is mounted on said output shaft is axially moveable thereon, and torque responsive means operatively interposed between said one of said first friction cone and ring and said output shaft operable to thrust said one of said first friction cone and ring axially toward said intermediate shaft in response to torque developed on said output shaft.

10. A transmission according to claim 1 in which said intermediate shaft is disposed at an angle of from about 6° to about 9° formed relative to the axis of said output shaft.

11. A transmission according to claim 9 in which said output shaft comprises first and second parts in telescopic engagement, said first part being nonaxially moveably supported in said frame, said second part being axially moveable on said first part and supporting said one of said first friction cone and ring, said torque responsive means being interposed between said parts of said output shaft.

12. A transmission according to claim 11 in which said torque responsive means comprises cooperating elements of cam and follower means on said parts of said output shaft responsive to relative rotation between said parts for urging said second part toward said intermediate shaft.

13. A transmission according to claim 12 in which said cam and follower means comprises a diametral pin in one of said shaft parts and a notch having inclined walls in the other shaft part and engaging said pin.

14. A transmission according to claim 1 in which both of said friction cones have the apex on the same axial side and each friction ring engages the respective friction cone on a corresponding side of the axis of said intermediate shaft.

15. A transmission according to claim 1 in which said first friction cone is mounted on said input shaft and said first friction ring is mounted on said output shaft.

16. In a variable friction disc transmission including a housing with an input shaft carrying a first runner in the form of a first friction cone and an output shaft carrying a second runner in the form of a first friction ring respectively connected in substantially identical axis arrangement, and connected with an intermediate shaft arranged on a support and comprising a second friction ring engaging said first friction cone and also comprising a second friction cone engaging a first friction ring while the support is journalled substantially linearly displaceable on the transmission housing approximately at a right angle to the direction of the transmission axis in the direction of the control movement, one runner being axially displaceable so that the second friction cone and the second friction ring are non-displaceable in axial direction and are mounted on the support, and guiding means moveable parallel to the axis of the first friction cone and the first friction ring, and said guiding means of the support being arranged at a radial distance with regard to the friction cones and the friction rings.

* * * * *